March 5, 1957 D. J. WHITEMAN ET AL 2,783,484
AUTOMATIC SCREW MACHINE ATTACHMENT
Filed Dec. 14, 1954 2 Sheets-Sheet 1

INVENTOR
DONALD J. WHITEMAN
JOHN J. KORYN

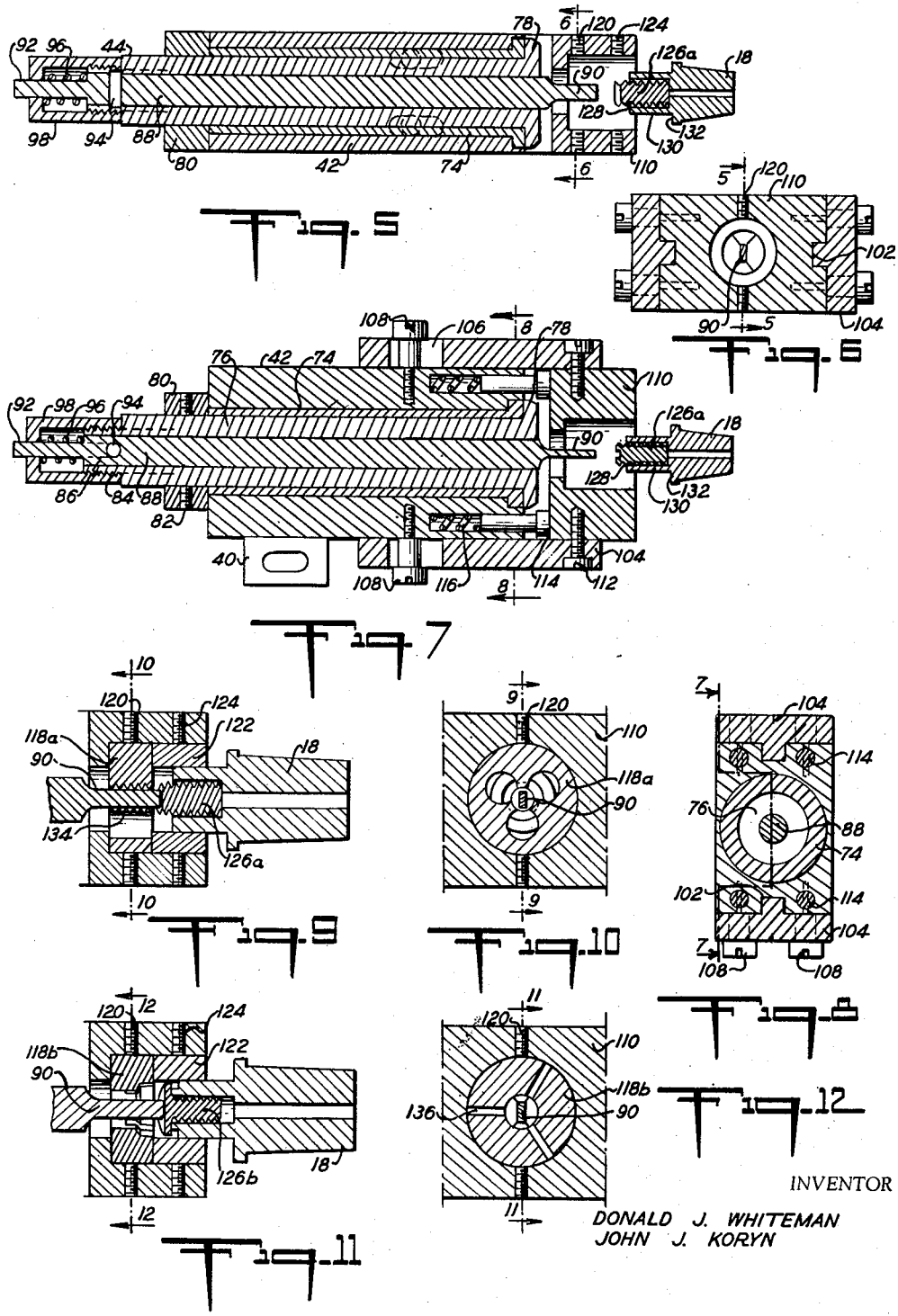

United States Patent Office 2,783,484
Patented Mar. 5, 1957

2,783,484

AUTOMATIC SCREW MACHINE ATTACHMENT

Donald J. Whiteman, Chatham, and John J. Koryn, Castleton-on-Hudson, N. Y., assignors to Anti-Corrosive Metal Products Co., Inc., Schodack, N. Y., a corporation of New York Application December 14, 1954, Serial No. 475,098

10 Claims. (Cl. 10—8)

This invention relates to an auxiliary attachment for an automatic screw cutting machine. Automatic screw cutting machines are designed to perform at high speeds the repetitive operations necessary to convert bar stock into screws or similar objects. They are highly effective in producing at low cost, the small parts that they are especially adapted to handle. However, the ordinary machine of this character is not ordinarily suited to carry out certain additional operations that are required on some parts so that it is necessary to perform these operations on separate machines. Where these operations must be applied to runs of small quantities, the additional cost of such operations may amount to as much as the entire production cost up to the point where these additional operations are carried out.

More specifically this invention contemplates an attachment that may be mounted on an automatic screw machine of conventional design to perform such operations as deburring, polishing and shaving as part of the normal production cycle of the machine without interference with the regular production cycle in any way. Moreover, because the part is operated upon in the original machine set-up and within the established time cycle, the likelihood of performance of the required operation with the desired degree of accuracy is materially increased.

The invention may best be understood by reference to the accompanying drawings wherein:

Figure 5 is a horizontal section along the lines 5—5 of Figure 6;

Figure 6 is a section along the lines 6—6 of Figure 5;

Figure 7 is a vertical section along the lines 7—7 of Figure 8;

Figure 8 is an endwise vertical cross-section along the lines 8—8 of Figure 7;

Figure 9 is an enlarged vertical cross-section of the tool holder and one type of tool, along lines 9—9 of Figure 10;

Figure 10 is a front cross-section taken along the lines 10—10 of Figure 9;

Figure 11 corresponds to Figure 9 showing another modification of tool; and

Figure 12 corresponds to Figure 10 showing the same modification found in Figure 11.

Figure 1:
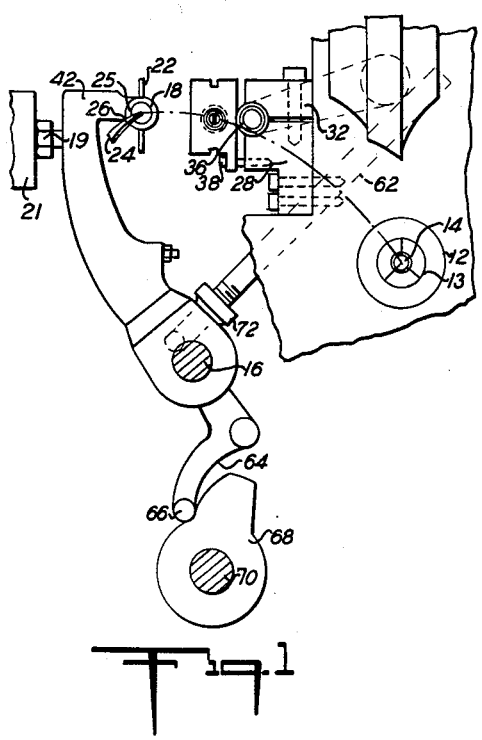
Figure 1 is an elevation of part of an automatic screw machine including our new device, parts of the screw machine being broken away to afford a better view of the attachment.
Figure 2:
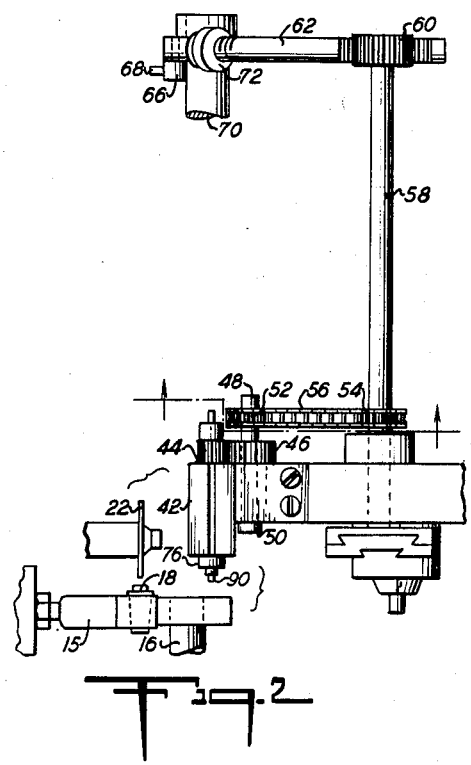
Figure 2 is a plan view corresponding to Figure 1.
Figure 3:
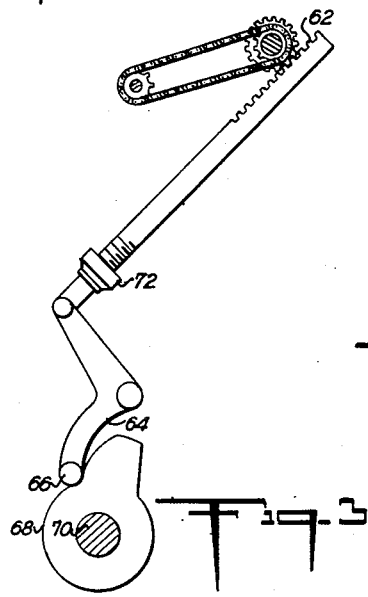
Figure 3 is an elevation along the lines 3—3 of Figure 2.
Figure 4:
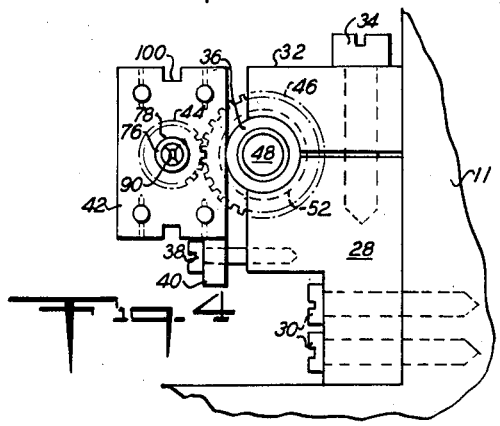
Figure 4 is an enlarged elevation of the attachment per se.

In each of Figures 1, 2 and 4 the tool holder block, tool holder and tools are omitted for the sake of clarity and in Figures 5 to 8 the tool and guide collar are omitted for the sake of clarity.

The conventional parts of the automatic screw machine so far as they relate to the present invention will first be described. In Figures 1 and 2 there is shown the output end of an automatic screw machine of conventional design. A stock bushing 12 holds and operates a collet 13 which holds the stock 14.

A screw receiving arm 15 is pivotally mounted on a shaft 16. The arm 15 is also slidable axially on the shaft 16; both the pivoting and sliding thereof being controlled by means of a set of cams not shown. On the end of the arm 15 is a lateral projection 17 serving to hold a split bushing 18, the axis of which is parallel to the shaft 16. The path of motion taken by the split bushing 18 is shown as a dot and dash arc in Figure 1.

When the arm 15 is rotated clockwise, the bushing 18 is in position to receive a partially completed screw from the stock bushing 12. The arm 15 is then rotated counterclockwise to a position slightly left of upright, where the set screw 19 mounted thereon abuts a stop 21. In this position, the head of the screw being operated upon in bushing 18 (facing away from the observer in Figure 1) is in alignment with the circular saw 22 mounted on a horizontal, constantly rotating shaft 23. Through the cam means mentioned hereinbefore, the arm 15 is slid forward on the shaft 16 to bring the head of the screw into engagement with the rotating saw 22 which cuts a conventional slot in the head thereof. The arm 15 remains in this position for an appreciable period of time while the rest of the machine goes through certain of its screw forming steps.

At the appointed time in the cycle, the arm 15 is drawn back on the shaft causing an ejector plate 24 fixedly mounted on the machine frame to enter into the bushing 18 through a radial split 25, and push from the bushing the completed screw which drops into a receiving basket below. It will be noted that a slot 26 is formed in the offset portion 17 registering with the split 25 in bushing 18, to permit penetration of the ejector plate 24 into the center of the bushing.

Conventional operation

A portion of the cycle of the conventional machine will be described, so far as it relates to the slot cutting and ejecting operation pertinent to this invention. At a given point in the cycle, the arm 15 rotates clockwise on the shaft 16 to bring the bushing 18 into axial alignment with the stock 14 which is being formed into a screw. A partially completed screw, formed from the stock 14 and still attached thereto, is received into bushing 18 by appropriate motion of the arm 15 along the shaft 16.

It is then severed from the rest of the stock and the arm 15 then rotates counterclockwise until the adjustable screw 19 abuts the stop member 21. Next the arm 15 advances, sliding on the shaft 16 until a slot of proper depth has been cut into the screw head by the rotating saw blade 22. The arm 15 remains in this position while other portions of the machine cycle continue to operate. The arm 15 then withdraws from the saw 22 causing the ejector plate to penetrate the bushing 18 and push the screw therefrom. The screw drops into a receiving basket below. At approximately this point in the cycle the arm 15 is ready to pivot clockwise to pick up another screw from the collet 13. The split 25 enables the arm to pivot directly down without first moving forward to pass the ejector 24 from the bushing 18.

Round head, binding head, flat fillister head and headless screws are left with a burr on the upper side adjacent the slot, which must be removed in many applications to which these screws are put. The manner in which the attachment constituting the present invention removes these burrs and otherwise finishes the head of the screw will now be described.

Secured to the frame of the machine 11 is attachment block 28 held in place by cap screws 30. Together with locking block 32, held onto attachment block 28 by means of cap screws 34 the locking block and attachment block form a bearing channel for adjusting cylinder 36. The adjusting cylinder 36 is attached to and forms a part of spindle body 42. By means of adjusting screws 38 passing through lugs 40 of the spindle body 42, the position of spindle body 42 may be adjusted so that its working parts are properly aligned with the path of transfer arm 15 as shown in the dot and dash line in Figure 1. Longitudinal adjustment of the spindle body 42 is brought about by releasing screws 34 holding locking block 32 and moving adjusting cylinder 36 forward or backwardly as may be necessary.

Pinion gear 44 meshes with drive gear 46 rotating on pilot shaft 48 journaled within adjusting cylinder 36 and held in place therein by retaining collar 50. On the end of pilot shaft 48 is small sprocket 52 driven by large sprocket 54 through chain 56. The large sprocket 54 is mounted on auxiliary side shaft 58 having gear 60 on the remote end thereof.

The gear 60 is actuated by rack 62 connected to cam lever 64. On the opposite end of the cam lever is cam roll 66 following cam 68 located on main cam shaft 70. As is common with such devices, an adjusting nut 72 is placed on the rack 62.

The spindle body 42 holds a spindle bearing 74 in which spindle 76 rotates. The spindle 76 is held in place by a front retaining shoulder 78 and a rear retaining collar 80 which is locked in place by means of set screw 82. Gear 44 is formed on the portion of the spindle extending beyond the collar 80.

The threaded rear end 84 of spindle 76 has a longitudinal slot 86. Within the spindle 76 is screw driver 88 having a point 90 and a reduced end 92. The screw driver 88 is connected to the spindle 76 by means of a drive pin 94 fixed in the rear end of the screw driver and movable longitudinally in the slot 86. The screw driver 88 is kept normally in forwardly extended position by means of spring 96 housed within end cap 98 screwed upon the threaded rear 84 of the spindle.

Extending longitudinally of spindle body 42 are ways 100 on the upper and lower surfaces thereof. These ways receive slides 102 formed on tool holder guide 104. The tool holder guide is capable of limited longitudinal movement on the spindle body 42, its movement being restricted by shoulder screws 108 passing through slots 106 in the tool holder guide 104 and fixed in spindle body 42. The tool holder guide is normally held in extended forward position by means of plungers 114 sunk in the body of the spindle body and pressed forward by springs 116. The plungers abut against the rear side of the tool holder 110 held in the tool holder guide by means of cap screws 112.

The tool holder 110 is adapted to receive at its rear portion a suitable tool 118 held in place by means of set screw 120 and at its front portion a guide ring 122 held in place by set screw 124.

The arrangement of tool holder guide 104, tool holder 110, tool 118 and guide ring 122 as a compact assembly, detachable from the spindle body 42 by the removal of the shoulder screws 108, makes it possible to change the tooling of the attachment with very little effort. The relationship of the parts requiring critical adjustment is not changed by their removal from the machine as a unit assembly, thereby effecting substantial labor savings, an important factor when only a small quantity of parts are needed in a single run. In this respect, the attachment is highly versatile.

The work piece 126 is held snugly but free to rotate in recess 128 in the head 130 of bushing 18. The head 130 is adapted to be guided to the tool 118 by means of guide ring 122, its inward movement against the face of the guide ring 122 being stopped by the shoulder 132 of the bushing 18.

Operation

The operation of the invention is intended to take place in that part of the cycle immediately following the cutting of the slot by the saw 22. The operation of the transfer arm 15 is so modified from the conventional manner of operation that instead of the arm remaining fixed until the time for screw ejection, the arm 15 is first backed off from saw 22 enough to disengage the work piece 126 but not enough to cause the ejector plate 24 to penetrate the bushing 18. The transfer arm 15 is then pivoted clockwise until the screw 126 held in the split bushing 18 is in line with the blade 90 of the screw driver 88. The arm 15 is then advanced axially on shaft 16 until the head 130 of the bushing 18 enters the guide ring 122. This serves to center the screw 126 with respect to the rotating bit 90 thereby insuring steady deburring action.

Meanwhile the rotation of cam shaft 70 has brought cam 68 to the point where cam roll 66 has begun to rise on the cam thereby causing the screw driver to begin to revolve. Where the work piece 126 is a headless set screw 126a, the thrusting action of the transfer arm 15 coupled with the rotation of the screw driver blade 90 causes the screw to be drawn into the tool 118 which is such case takes the form of a threading die 118a. The threads 134 thus serve to cut off the burr left by slotting saw 22.

As the cam continues to move forward, the cam roll 64 begins to drop off and the rack 62 reverses the rotation of the gear 60 to spin the screw out of the die 118a.

When the screw has been completely backed out of the die, the arm 15 is then retracted from the bit 90 and pivoted back into the position where bushing 18 is opposite the saw 22. One cycle of the operation of the invention is thus completed, and there remains only the conventional ejection of the screw by the further retraction of the transfer arm 15 which causes the ejector plate 24 to push the screw 126 out of the bushing and into a receiving basket below.

As shown in Figure 11 the head of a headed screw 126b may be deburred and otherwise finished, as by shaving, by substituting tool 118b for the threading die 118a. In this arrangement lands 136 are provided on the inner surface of the tool 118b for conforming the finished surface of the head screw 126b to the desired shape, thereby shaving away the burr that has been formed by saw 22.

Although not shown in the drawing, it will be apparent that the underside of a screw 126 may be similarly shaved and shaped by means of lands formed on the head 130 of the bushing 18.

From the above description it will be seen that there has been described and disclosed an improved attachment for an automatic screw making machine that enables the machine to turn out screws free of burrs without lengthening the operational cycle of the machine, regardless of the type of screw manufactured whether it be round headed, flat headed or headless. It will be understood that this invention may be made and utilized in many different sizes and arrangements depending upon the screw making machine to which it is to be applied and upon the type of screw which is to be deburred; and that various modifications and changes may be made in the invention without departing from the spirit and scope thereof as set forth in the appended claims.

This deburring device has the advantage that it may be arranged to operate for a precise number of revolutions of the screw driver, and consequently the screw against the cutting tool, whereby the cutting operation may be accurately controlled. Also by design of the shoulder 132, the exact depth of cut is subject to control. Because both forward and reverse drive is provided for the screw driver, operation upon a headless screw is possible. Also since it is possible to work upon both outer and inner surfaces of the screw head, any desired form of work is made possible.

We claim:

1. In screw fabricating machinery including a pivotally mounted arm, a bushing mounted thereon, adapted to receive a screw from a thread forming portion of the machinery, a saw for cutting a slot in the head of the screw while being held in said bushing and means for pivoting said arm into slot cutting engagement with said saw, thereby to cut a slot in the screwhead, the improvement which comprises: a screw driver bit mounted adjacent the saw for rotation about its axis, means for rotating said bit; a cutter non-rotatably and concentrically mounted upon an axis common with the screw driver for shaping the head of a screw when said screw is rotated in axial alignment with said cutter, an opening in said cutter on the axis thereof for permitting the insertion of the screw driver bit for engagement with the screw; means for holding the screw driver out thrust through said opening; means for pivoting said arm into axial alignment with said bit and said cutter, means for thrusting said arm into screw-engaging position with respect to said bit and said cutter thereby to turn said screw and cause it to be cut about the head.

2. The combination of claim 1 wherein the means for holding the screw driver out thrust is resilient to normally hold the screw driver out.

3. The combination of claim 1 including a centering sleeve mounted in axial alignment with said driver and cutter whereby the bushing may be inserted in said sleeve to guide the screw into proper operaitve relation to said cutter.

4. The combination of claim 1 wherein the means for rotating the bit operates intermittently and in synchronized relation with the pivoting of the screw-holding arm.

5. In screw fabricating machinery including a pivotally mounted arm, a bushing mounted thereon, adapted to receive a screw from a thread forming portion of the machinery, a saw for cutting a slot in the head of the screw while being held in said bushing and means for pivoting said arm into slot cutting engagement with said saw, thereby to cut a slot in the screwhead, the improvement which comprises: an attachment for operating on a screw after it has been slotted, such attachment being secured to the machinery at a point in the path of the free end of the arm, said attachment including a cylinder-receiving bearing mounted on the machinery, a tool-holding element including a cylinder, said cylinder being rockable about its axis in said bearing and slidable along the length thereof for adjustable engagement of the tool mounted thereon and clamping means for holding the cylinder fixed in the bearing.

6. In screw fabricating machinery including a pivotally mounted arm, a bushing mounted thereon, adapted to receive a screw from a thread forming portion of the machinery, a saw for cutting a slot in the head of the screw while being held in said bushing and means for pivoting said arm into slot cutting engagement with said saw, thereby to cut a slot in the screwhead, the improvement which comprises: a screw driver bit mounted for rotation about its axis, means for rotating said bit; a cutter non-rotatably and concentrically mounted upon an axis common with the screw driver for shaping the head of a screw when said screw is rotated in axial alignment with said cutter, an opening in said cutter on the axis thereof for permitting the insertion of the screw driver bit for engagement of said screw; means for holding the screw driver out thrust through said opening; means for mounting the cutter in operative relation to said screw driver including a resilient means for urging the cutter toward the screw to be cut; means for pivoting said arm into axial alignment with said bit and said cutter, means for thrusting said arm into screw-engaging position with respect to said bit and said cutter thereby to turn said screw and cause it to be cut about the head.

7. The combination of claim 6 wherein the means for holding the screw driver out thrust is resilient to normally hold the screw driver out.

8. The combination of claim 6 wherein the screw is a slotted, headless set-screw, the cutter is a thread-cutting die and the means for rotating the bit is reversible so as to disengage the die and the screw.

9. Apparatus for shaping the heads of screws comprising a bushing adapted to receive the threaded end of a screw to be shaped, a cutter in position to shape the head of a screw when said screw is rotated in axial alignment with said cutter, an opening in said cutter along the axis thereof, permitting the insertion of a rotatable driver blade, a rotatable driver and means for driving the same, means for holding said cutter and driver in coaxial relation, axially resilient means engaging said driver and said holding means normally urging said driver in the direction of said bushing sufficiently to enable the driver bit to engage the head of the screw through the cutter opening and a centering sleeve mounted in coaxial relation with said driver and cutter whereby the bushing may be inserted in said sleeve to bring the screw into proper operative relation to said cutter.

10. The combination of claim 9 wherein the screw is a slotted, headless set-screw, the cutter is a thread-cutting die and the means for rotating the bit is reversible so as to disengage the die and the screw.

References Cited in the file of this patent

UNITED STATES PATENTS 2,564,699    Kochel _____ Aug. 21, 1951